July 3, 1962  R. J. HAIGIS ETAL  3,042,508
NON-LOADING METAL-BACKED ABRADER AND METHOD FOR ITS PRODUCTION
Filed May 28, 1959

INVENTORS
RUSSELL J. HAIGIS
AUSTIN L. STOWELL
BY
Lindsey Prutzman & Hayes
ATTORNEYS / 3,042,508
NON-LOADING METAL-BACKED ABRADER AND
METHOD FOR ITS PRODUCTION
Russell J. Haigis and Austin L. Stowell, New Britain,
Conn., assignors to The Stanley Works, New Britain,
Conn., a corporation of Connecticut
Filed May 28, 1959, Ser. No. 816,363
7 Claims. (Cl. 51—295)

This invention relates to abraders, and more particularly to a novel metal-backed abrader provided with a coating to reduce or eliminate loading, and to the method for its production.

Metal-backed abraders such as sanding discs, shapers, files and the like are extensively employed on painted or varnished surfaces, resinous woods, plastics, plaster, and other synthetic surfaces. Frequently, the abraded particles tend to cling to the metal substrate between the abrasive cutters until the accumulation substantially lessens the abrading action of the tool. This effect is commonly described as "loading."

Oftentimes the loading becomes sufficient to completely impair the abrading action, and the tool then burns or scores the surface being treated. Additionally, the loaded areas will tend to make the operation of the tool non-uniform, resulting in "chatter." This problem of loading becomes especially severe in power-driven tools because of the higher speeds of operation and the higher frictional temperatures which are produced at the abrading surface.

As a result of this loading, the operator has to stop and either clean or change abraders. In order to remove the accumulated particles, laborious procedures must be employed, such as wire brushing and/or solvent cleaning, the latter of which is both malodorous and a fire hazard. Especially with freshly painted surfaces and with resinous woods, this cleaning activity can be both very frequent and extremely time consuming.

It is an object of this invention to provide a metal-backed abrader having a novel coating to substantially prevent loading. Another object is to provide a method for producing a metal-backed abrader having an anti-loading film which is extremely durable and effective, even at temperatures encountered in power-driven tools. A further object is to provide an anti-loading coating which is resistant to attack by solvents. Other objects and advantages will be readily apparent from the following detailed description and claims.

Figure 1:
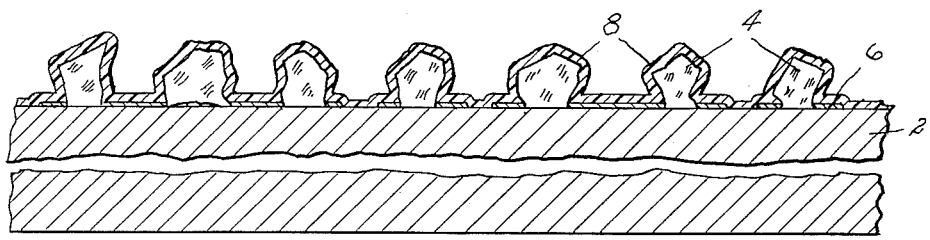
Figure 2:
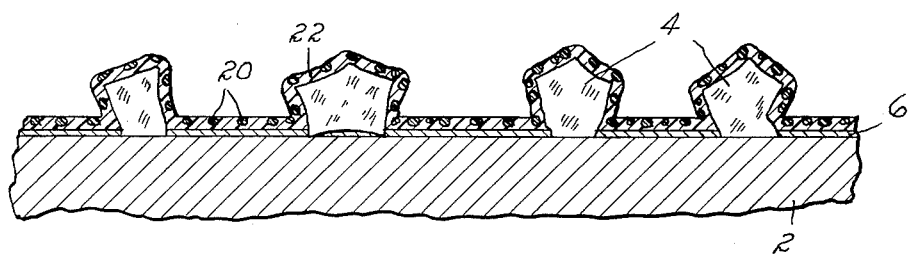

In the drawings:
FIG. 1 is an enlarged fragmentary cross section of a brazed abrasive metal-backed abrader having a single component non-loading coating; and
FIG. 2 is a fragmentary cross section of the abrader having a coating of non-loading particles dispersed in a continuous medium.

It has now been found that a metal-backed abrader can be made resistant to loading by applying thereto a resin consisting essentially of fluoroethylene polymer and then curing the resin to a hard, durable coating which is at least 0.1 mil in thickness. The resinous coating may be applied by spraying, dipping, rolling, or any other suitable method.

The term "fluoroethylene polymer" as used herein refers to polymers selected from the group consisting of polytetrafluoroethylene, polytrifluorochloroethylene, copolymers containing tetrafluoroethylene and copolymers containing trifluorochloroethylene.

The term "cutters," as used herein, refers to the abrasive points on the abrader whether made by bonding abrasive particles to the backing, or by punching, milling or otherwise forming them on the metal backing.

Although a lacquer or dispersion consisting substantially entirely of the fluoroethylene polymer may be applied to the surface of the abrader, a dispersion of the polymer with a second resin of heat-stable or thermosetting character has also been found suitable, but the fluoroethylene polymer content must be at least 50 percent and preferably more than 65 percent of the dispersed solids.

Referring to the attached drawings, the invention is illustrated as applied to an abrader consisting of a metal backing 2 and abrasive particles 4 bonded thereto by brazing metal 6. In FIG. 1, the non-loading coating 8 is a continuous sintered layer of fluoroethylene polymer which is shown as covering the abrasive particles 4 as the result of the process of the application. As will be readily understood, the coating 8 on the abrading surfaces will be rapidly worn away during initial use. In FIG. 2, the non-loading coating is a dispersion of fluoroethylene particles 20 in a heat-stable resin 22 so as to form a continuous coating. As illustrated, the fluoroethylene polymers float or rise to the surface of the non-loading coating.

Lacquers or dispersions consisting substantially entirely of fluoroethylene polymer must be sintered at a temperature of about 650–800° F., and preferably 680–750° F., for several minutes to form a continuous, durable coating of the polymer. Exemplary of these are the aqueous dispersions of tetrafluoroethylene and trifluorochloroethylene sold by E. I. du Pont de Nemours, Wilmington, Delaware.

Co-dispersions of the fluoroethylene polymer with other thermosetting resins must be cured at a temperature which will ensure complete setting of the coating, generally the curing temperature of the added resin which serves to extend and bond the dispersed particles of fluoroethylene polymer. Although this will generally require heating at a temperature above about 250° F., some catalyzed resins will effectively set and cure at room temperature. Exemplary of these co-dispersions is "Emralon 310," containing tetrafluoroethylene and phenol-formaldehyde resins, a product of Acheson Colloids Company, Port Huron, Michigan, which must be cured at a temperature of about 300–400° F. Illustrative compositions are fully described in United States Patent No. 2,825,706.

The anti-loading coating is most beneficial to power-driven abrading tools having a metal backing to which abrasive grits are bonded, such as sanding discs and orbital sanders. Exemplary of these tools are the heavy-duty sanding tools provided by copper-brazing tungsten carbide grits to a metal substrate. However, the invention has also been applied with considerable benefit to hand-operated sanders and other metal-backed abraders, including those which have the cutters milled, punched or etched in the metal backing or substrate, such as files and shapers.

As previously stated, the coating must be at least 0.1 mil in thickness, and is preferably about .2 to .4 mil. Of course, the coating must be of lesser thickness than the height of the cutters so as not to interfere with the abrading action, and a practical upper limit is about 1 mil.

If so desired, a primer coating may be applied, which generally will consist of a co-dispersion of fluoroethylene polymer with another thermosetting polymer, and the finish coating deposited thereon. This procedure may sometimes be preferable for maximum bonding to the metal substrate, although it is not generally necessary for ferrous metal.

The metal backing should be free from grease and rust in order to secure maximum bond strength. Vapor and liquid solvent degreasing have been found suitable, as well as alkaline treatment. Phosphating and formic acid immersions have also proven beneficial in some instances.

Example 1

Two circular sanding discs five inches in diameter were prepared by copper-brazing tungsten carbide abrasive particles to a steel backing or substrate. The abrading surface of one of the discs was degreased with solvent, and sprayed with an aqueous dispersion of tetrafluoroethylene resin to develop a dry coating which was sintered at 700° F. for four minutes, and found to be about 0.2 mil in thickness.

The treated sanding disc and the untreated disc were attached to power-driven drills and then used to sand pine and fir plywood boards which had been painted only five days previously wtih a commercial-type air-drying white house paint. Whereas the untreated disc loaded quickly with the removed paint particles and became rough and unsatisfactory in operation, the treated disc resisted accumulation for a much longer period. Cleaning of the treated disc was accomplished simply by a bristle brush, although the accumulated particles on the untreated disc could not be removed in this manner, and solvent treatment was considered necessary.

Example 2

A five-inch tungsten carbide sanding disc was coated on one-half of its abrading surface with an aqueous co-dispersion of fluoroethylene polymer and phenol-formaldehyde resin, the fluoroethylene polymer constituting more than half of the solids, and sold under the trade name "Emralon 310." This composition is prepared by adding an aqueous suspension of colloidal tetrafluoroethylene resin to a dispersion of heat-reactive phenol-aldehyde resin in a water-miscible solvent generally comprised of aromatics and aliphatic alcohols. The water and solvents evaporate to deposit a film wherein the particles of tetrafluoroethylene resin are oriented along the top surface. The tetrafluoroethylene particles in the dispersion are on the order of less than 1 micron in size, but agglomerate to form clumps on the order of about 10 microns. The film on the disc was air-dried and then baked at 300° F. for one hour and the film was found to be 0.3 mil in thickness. The coated abrader was applied to a drill and used to sand painted pine and fir plywood boards. The treated portion resisted accumulation of the wood and paint particles, whereas the untreated surface loaded quickly making the operation rough and unsatisfactory. Those particles which did deposit on the treated surface were readily removed by a bristle brush, but the accumulated particles on the untreated portion continued to adhere and solvent cleaning was considered necessary.

It will be readily apparent from the foregoing description and examples that the metal-backed abraders of the present invention will accelerate abrading operations, and substantially eliminate the tedious, malodorous and dangerous practice of solvent cleaning which is presently necessary. The invention is one which is easily and economically practiced, and provides a coating which not only resists loading, but will also increase corrosion resistance as well as provide a surface which is resistant to solvent attack.

Although but several embodiments have been described, it will be readily apparent to those skilled in the art that numerous modifications can be made within the scope and spirit of the invention.

Having thus described the invention, we claim:

1. An abrader resistant to loading by abraded particles comprising a self-sustaining metal-backed abrader having cutters spaced over the surface thereof, and a superposed coating consisting essentially of fluoroethylene polymer selected from the group consisting of polytetrafluoroethylene, polytrifluorochloroethylene, copolymers containing tetrafluoroethylene and copolymers containing trifluorochloroethylene, said coating being at least 0.1 mil in thickness and heat-stable.

2. An abrader resistant to loading by abraded particles comprising a metal backing, cutting teeth integrally formed in said metal backing over one surface thereof, and a superposed coating on said one surface consisting essentially of fluoroethylene polymer selected from the group consisting of polytetrafluoroethylene, polytrifluorochloroethylene, copolymers containing tetrafluoroethylene and copolymers containing trifluorochloroethylene, said coating being at least 0.1 mil in thickness and less than the height of the cutting teeth, and said coating being heat-stable.

3. An abrader resistant to loading by abraded particles comprising a metal backing, abrasive particles, bonding material bonding the abrasive particles to one surface of said backing, and a superposed coating on said one surface consisting essentially of fluoroethylene polymer selected from the group consisting of polytetrafluoroethylene, polytrifluorochloroethylene, copolymers containing tetrafluoroethylene and copolymers containing trifluorochloroethylene, said coating being at least 0.1 mil in thickness and heat-stable.

4. A power-driven abrader resistant to loading by abraded particles comprising a ferrous metal backing, tungsten carbide abrasive particles, brazing metal bonding said tungsten carbide particles to one surface of said backing to define abrading surfaces, and a coating superposed on said one surface consisting essentially of tetrafluoroethylene polymer, said coating being 0.1–1.0 mil in thickness and heat-stable.

5. The method for making an abrader which is resistant to loading by abraded particles comprising providing a self-sustaining metal-backed abrader having cutters spaced over one surface thereof, applying to said one surface of said abrader a liquid dispersion containing essentially fluoroethylene polymer selected from the group consisting of polytetrafluoroethylene, polytrifluorochloroethylene, copolymers containing tetrafluoroethylene and copolymers containing trifluorochloroethylene to develop a dry superposed coating at least 0.1 mil in thickness; and curing said coating, said cured coating being heat-stable.

6. The method for making an abrader which is resistant to loading by abraded particles comprising providing a metal backing, bonding abrasive particles to one surface of said backing by brazing metal to define abrading surfaces, applying to said one surface a liquid resin dispersion containing essentially fluoroethylene polymer selected from the group consisting of polytetrafluoroethylene, polytrifluorochloroethylene, copolymers containing tetrafluoroethylene and copolymers containing trifluorochloroethylene to develop a dry coating at least 0.1 mil in thickness; and curing said coating, said cured coating being heat-stable.

7. The method for making an abrader which is resistant to loading by abraded particles comprising integrally forming cutters in one surface of a metal backing to define abrading surfaces, applying to said one surface a liquid resin dispersion containing essentially fluoroethylene polymer selected from the group consisting of polytetrafluoroethylene, polytrifluorochloroethylene, copolymers containing tetrafluoroethylene and copolymers containing trifluorochloroethylene to develop a dry coating at least 0.1 mil in thickness; and curing said coating, said cured coating being heat-stable.

References Cited in the file of this patent

UNITED STATES PATENTS

| | | |
|---|---|---|
| 2,468,664 | Hanford | Apr. 26, 1949 |
| 2,562,587 | Swearingen | July 31, 1951 |
| 2,595,733 | Tone et al. | May 6, 1952 |
| 2,655,775 | Lewis | Oct. 20, 1953 |
| 2,906,612 | Anthony et al. | Sept. 29, 1959 |